United States Patent
Vasseur et al.

(10) Patent No.: US 10,952,115 B2
(45) Date of Patent: Mar. 16, 2021

(54) DETECTING STABLE WIRELESS CONDITIONS TO REBALANCE AP LOADS IN LARGE (CONFERENCE) ROOMS

(71) Applicant: Cisco Technology, Inc., San Jose, CA (US)

(72) Inventors: Jean-Philippe Vasseur, Saint Martin d'uriage (FR); Pascal Thubert, Roquefort les Pins (FR); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/359,011

(22) Filed: Mar. 20, 2019

(65) Prior Publication Data
US 2020/0305049 A1  Sep. 24, 2020

(51) Int. Cl.
| | |
|---|---|
| *H04W 36/22* | (2009.01) |
| *H04W 36/08* | (2009.01) |
| *H04W 36/32* | (2009.01) |
| *H04W 52/40* | (2009.01) |
| *H04W 36/38* | (2009.01) |
| *H04W 84/12* | (2009.01) |

(52) U.S. Cl.
CPC .......... *H04W 36/22* (2013.01); *H04W 36/08* (2013.01); *H04W 36/32* (2013.01); *H04W 36/385* (2013.01); *H04W 52/40* (2013.01); *H04W 84/12* (2013.01)

(58) Field of Classification Search
CPC ..... H04W 36/22; H04W 36/08; H04W 36/32; H04W 36/385; H04W 52/40; H04W 84/12
See application file for complete search history.

(56) References Cited

U.S. PATENT DOCUMENTS

| | | | | |
|---|---|---|---|---|
| 2008/0181184 A1* | 7/2008 | Kezys | ................... | H04W 16/08 370/338 |
| 2010/0118830 A1* | 5/2010 | Stephenson | ............. | H04L 63/10 370/331 |
| 2011/0070863 A1* | 3/2011 | Ma | ........................ | H04W 4/029 455/410 |

(Continued)

OTHER PUBLICATIONS

Malik, Ajay., "How machine learning can solve wireless network issues", https://venturebeat.com/2017/03/15/how-machine-learning-can-solve-wireless-network-issues/, 2 pages, Mar. 15, 2017., venturebeat.com.

(Continued)

*Primary Examiner* — Kodzovi Acolatse
(74) *Attorney, Agent, or Firm* — Behmke Innovation Group; Kenneth J. Heywood; James J. Wong (57) ABSTRACT

In one embodiment, a supervisory service for a wireless network receives telemetry data indicative of client movement of wireless clients of the network within a location. The service determines a measure of client movement stability for the location, based on the received telemetry data. The service selects one or more of the clients for wireless access point reassignment, when the determined measure of client movement stability exceeds a predefined threshold. The service causes the selected one or more clients to switch from a first wireless access point at the location to a second wireless access point at the location.

18 Claims, 7 Drawing Sheets

(56) References Cited

U.S. PATENT DOCUMENTS

| | | | | |
|---|---|---|---|---|
| 2013/0066936 | A1* | 3/2013 | Krishnan | H04L 67/289 709/201 |
| 2015/0332457 | A1* | 11/2015 | Mestha | G06T 7/0016 382/103 |
| 2016/0192239 | A1* | 6/2016 | Salvador | H04W 28/0268 370/331 |
| 2016/0212673 | A1 | 7/2016 | Gangadhar et al. | |
| 2017/0026888 | A1 | 1/2017 | Kwan | |
| 2017/0265138 | A1* | 9/2017 | Saeki | H04W 48/16 |
| 2017/0318325 | A1* | 11/2017 | Ortiz | H04N 21/436 |
| 2017/0364933 | A1* | 12/2017 | Chen | G06Q 10/067 |
| 2018/0124646 | A1 | 5/2018 | Thubert et al. | |
| 2018/0317106 | A1 | 11/2018 | Konstantinou et al. | |

OTHER PUBLICATIONS

Marek, Sue.,"WiFi Startup Mist Uses Machine Learning to Improve Connectivity", https://www.sdxcentral.com/articles/news/wifi-startup-mist-uses-machine-learning-to-improve-connectivity/2017/07/, 2 pages, Jul. 26, 2017., SDxCentral.

Mathias, Craig., "Machine Learning Helps Tame the Complexities of WiFi Networks-and More", Management & Mobility, https://www.itprotoday.com/management-mobility/machine-learning-helps-tame-complexities-wifi-networks-and-more, 2 pages, Aug. 15, 2018., ITProToday.

"Extreme Networks Introduces AI-Powered Edge Network Solution to Accelerate Business Transformation for Enterprise Customers", http://investor.extremenetworks.com/news-releases/news-release-details/extreme-networks-introduces-ai-powered-edge-network-solution, 3 pages, Accessed on Nov. 7, 2018., Extreme Networks, Inc.

"Industry Solutions—KodaCloud", https://kodacloud.com/industry-solutions/, 3 pages, Accessed on Nov. 7, 2018., KodaCloud Inc.

"KodaCloud Announces Partnership with Extreme Networks to Bring the Power of Cloud-Based Artificial Intelligence to Enterprise WLANs", https://kodacloud.com/2018/06/05/extreme-networks/, 3 pages, Jun. 5, 2018., KodaCloud Inc.

\* cited by examiner

DETECTING STABLE WIRELESS CONDITIONS TO REBALANCE AP LOADS IN LARGE (CONFERENCE) ROOMS

TECHNICAL FIELD

The present disclosure relates generally to computer networks, and, more particularly, to detecting stable wireless conditions to rebalance access point (AP) loads in large conference rooms and other rooms.

BACKGROUND

Wireless networks are becoming more and more ubiquitous, with many businesses, schools, etc. now even offering Wi-Fi connectivity to guests. With respect to designing a wireless network, access points are typically installed at spots that maximize coverage. For example, access points may be spaced such that the received signal strength indicator (RSSI) measurement by a client at any point in the location will be above a certain threshold for at least one of the access points. Doing so ensures that a wireless client of the network will always have connectivity with the network. The deployment of access points may also take into account the expected client loads, with more access points being installed at locations in which a large number of clients are expected to be present.

Wireless client roaming is typically initiated at the client level. For example, if the RSSI of the access point to which a client is attached falls below a threshold and the RSSI to another access point is above the threshold, the client may opt to roam to the other access point. While allowing the clients to select the best access point ensures the best experience from the standpoint of the client, there is also the tendency of clients to remain attached to an access point until there is reason to roam to another access point. For certain locations, such as conference rooms, this means that clients have the tendency to gravitate to certain access points over others, concentrating the client load on some of the access points over others.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a supervisory service for a wireless network receives telemetry data indicative of client movement of wireless clients of the network within a location. The service determines a measure of client movement stability for the location, based on the received telemetry data. The service selects one or more of the clients for wireless access point reassignment, when the determined measure of client movement stability exceeds a predefined threshold. The service causes the selected one or more clients to switch from a first wireless access point at the location to a second wireless access point at the location.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
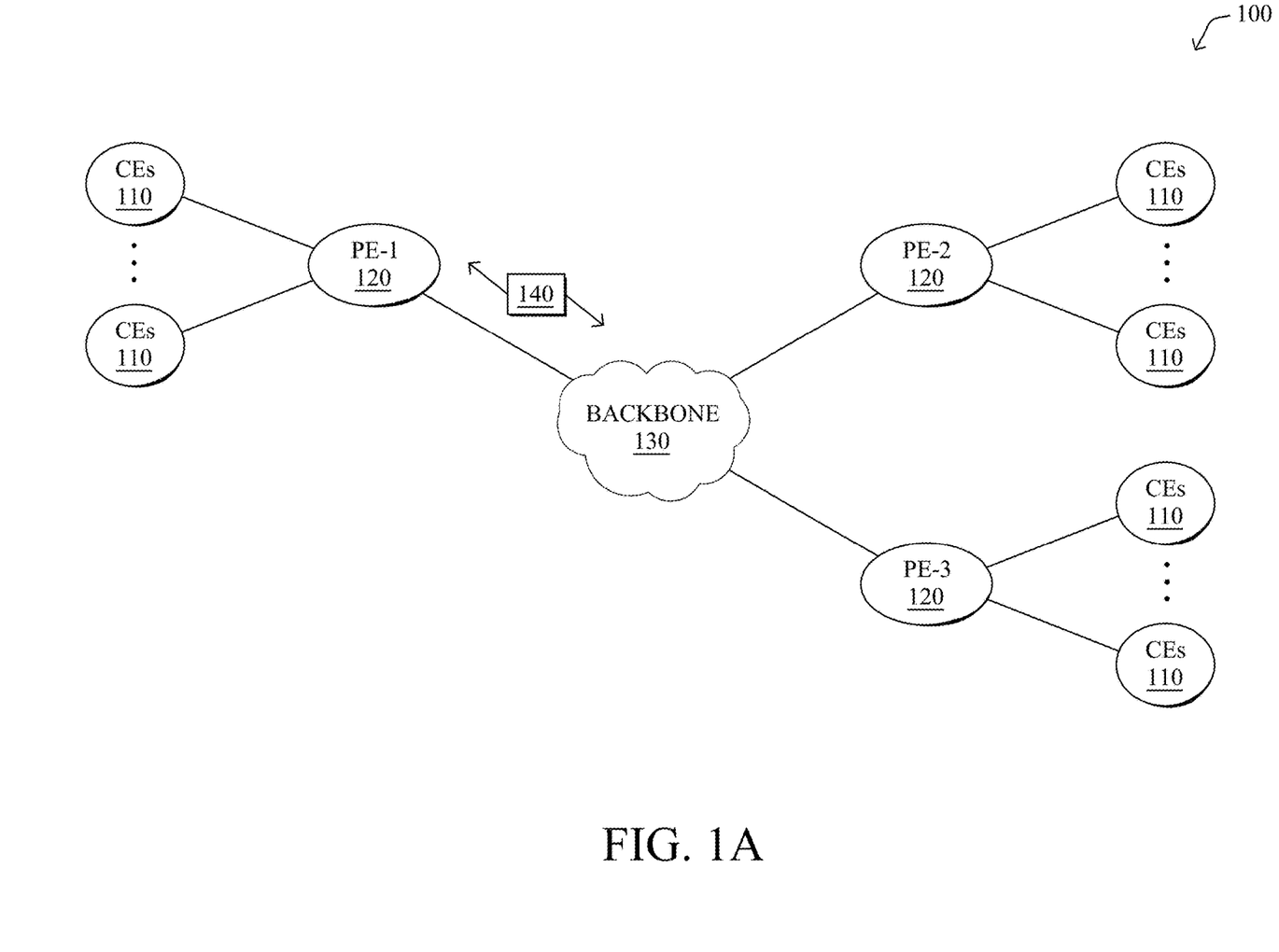
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
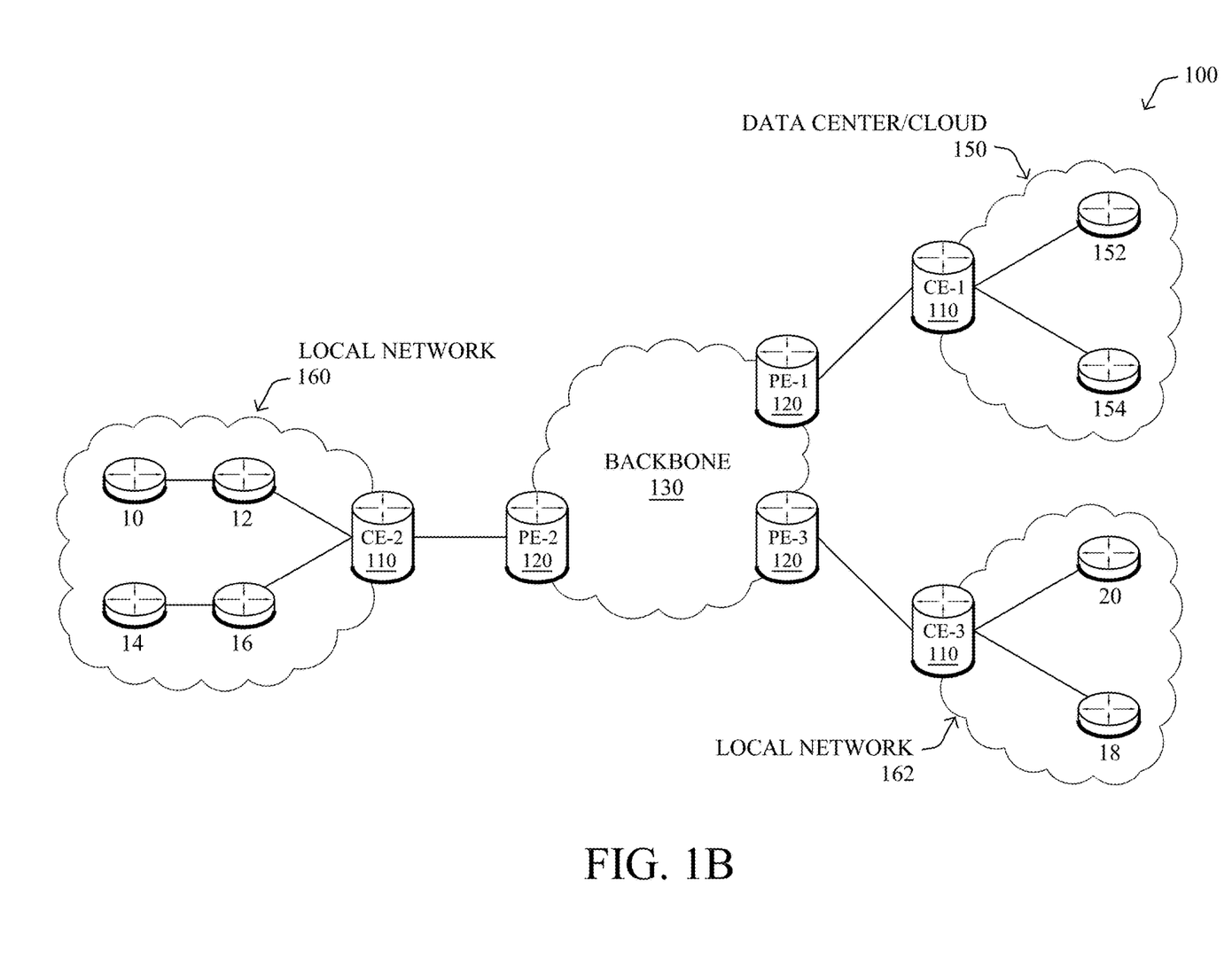

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
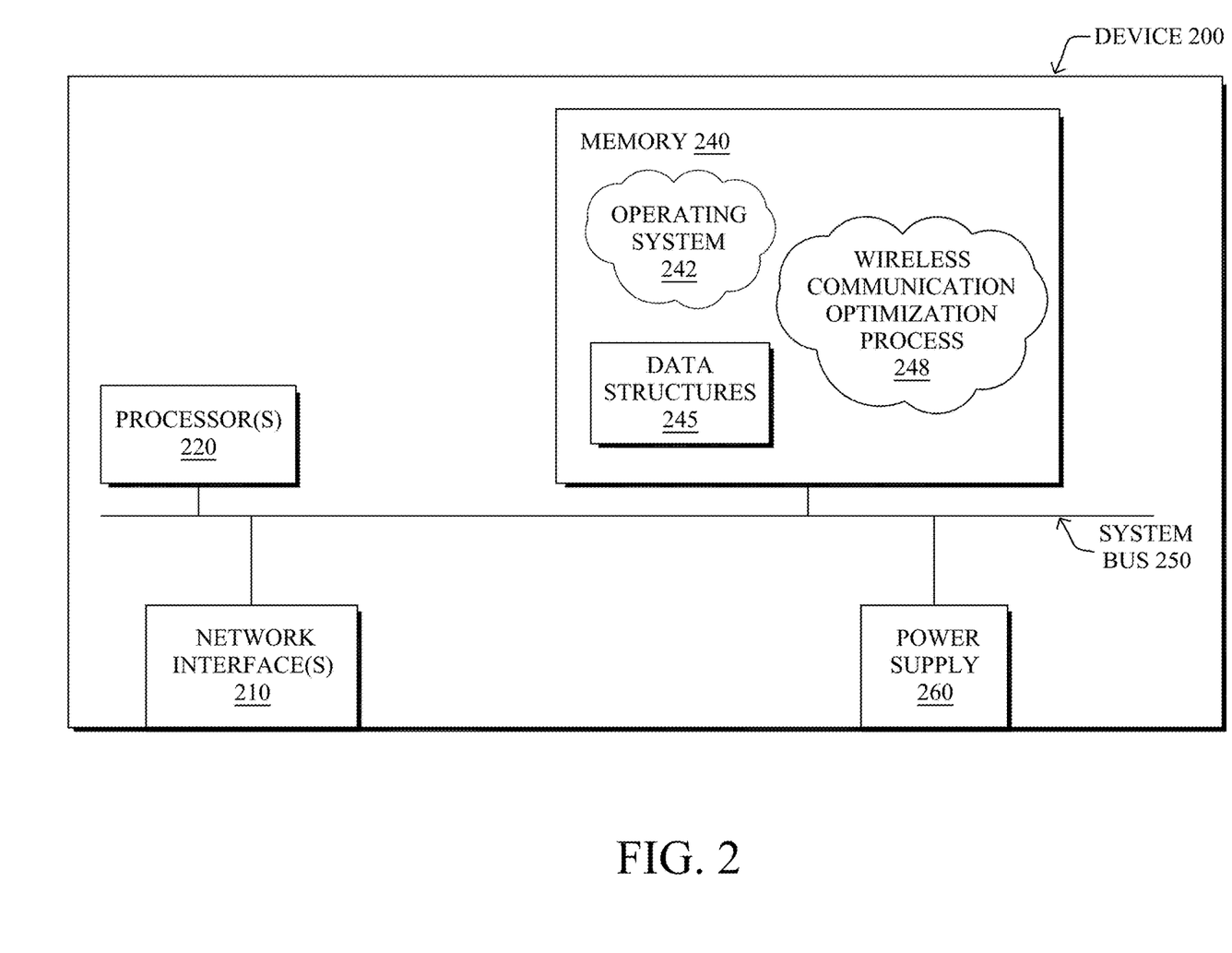
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative wireless communication optimization process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, wireless communication optimization process 248 may utilize machine learning techniques, to monitor, analyze, and control device behavior in a wireless network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of monitoring, analyzing, and controlling device behavior in a wireless network, a learning machine may construct a model of the observed behavior of a given client or type of client. Such a model can then be used in the wireless network to control the behavior of a device in a wireless network, such as a wireless access point (AP). Example machine learning techniques that may be used to construct such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of monitoring, analyzing, and controlling device behavior in a wireless network is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of similarity (e.g., using a Euclidian distance and a cluster based local outlier factor that takes into account the cluster density). More specifically, in some embodiments, behavioral data for clients of the same type can be clustered and used to train a behavioral model for that type of client.

Replicator techniques may also be used for purposes of monitoring, analyzing, and controlling device behavior in a wireless network. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, wireless communication optimization process 248 may also use graph-based models for purposes of modeling and analyzing device behavior. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends"

of a user, etc.). The patterns of these connections can then be used for purposes of modeling behavior in the network.

Figure 3:
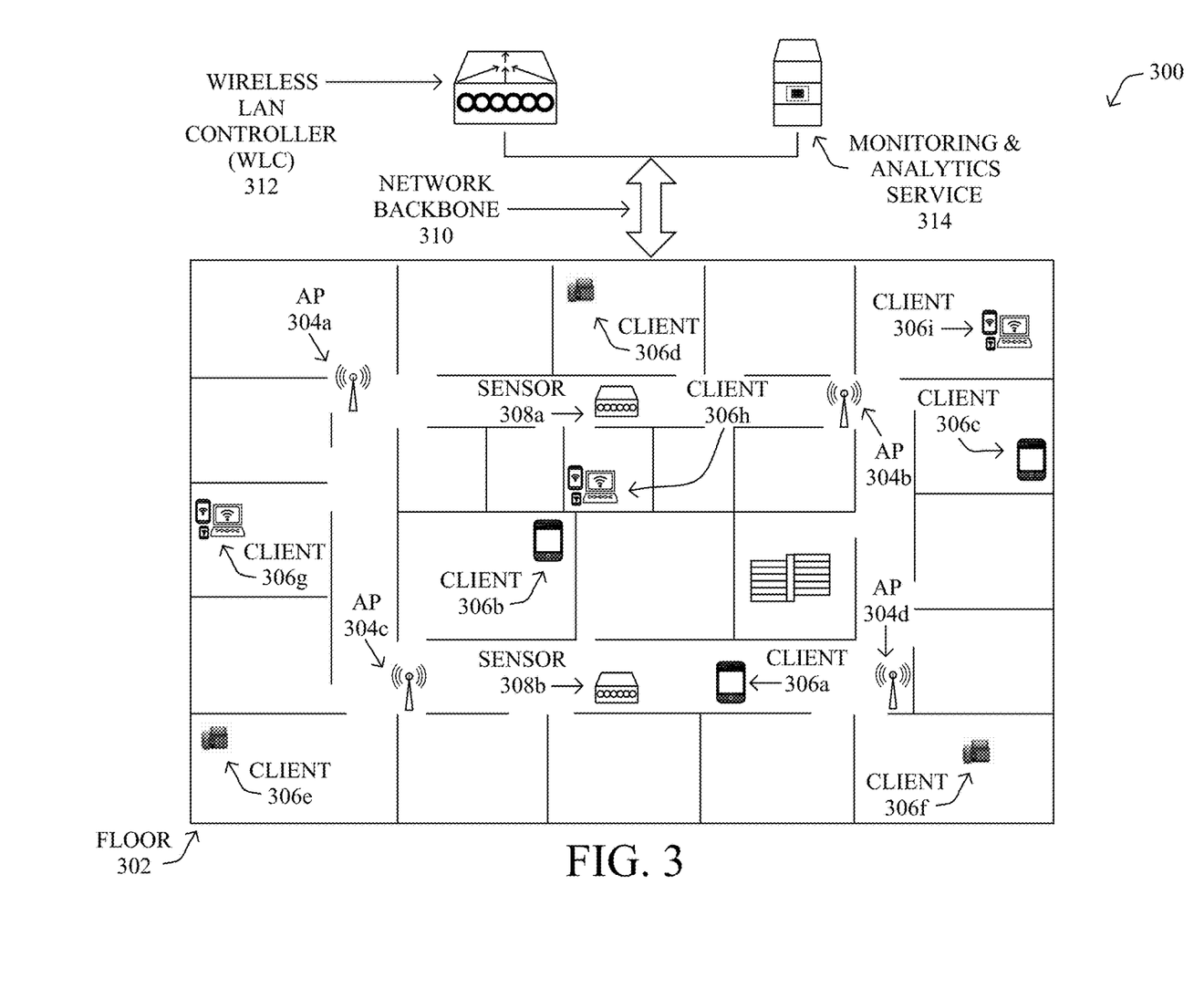
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless clients 306 distributed throughout the location. For illustrative purposes, APs 304a-304d and clients 306a-306i are depicted in FIG. 3. However, as would be appreciated, a wireless network deployment may include any number of APs and clients.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-404d, by setting their control parameters (e.g., max number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.).

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

In some embodiments, wireless network 300 may also include any number of wireless network sensors 308, such as sensors 308a-308b shown. In general, "wireless network sensors" are specialized devices that are able to act as wireless clients and perform testing on wireless network 300 and are not to be confused with other forms of sensors that may be distributed throughout a wireless network, such as motion sensors, temperature sensors, etc. In some cases, an AP 304 can also act as a wireless network sensor, by emulating a client in the network for purposes of testing communications with other APs. Thus, emulation points in network 300 may include dedicated wireless network sensors 308 and/or APs 304, if so configured.

During operation, the purpose of an emulation point in network 300 is to act as a wireless client and perform tests that include connectivity, performance, and/or negative scenarios, and report back on the network behavior to monitoring and analytics service 314. In turn, service 314 may perform analytics on the obtained performance metrics, to identify potential network issues before they are reported by actual clients. If such an issue is identified, service 314 can then take corrective measures, such as changing the operation of network 300 and/or reporting the potential issue to a network administrator or technician.

The types and configurations of clients 304 in network 300 can vary greatly. For example, clients 306a-306c may be mobile phones, clients 306d-306f may be office phones, and clients 306g-306i may be computers, all of which may be of different makes, models, and/or configurations (e.g., firmware or software versions, chipsets, etc.). Consequently, each of clients 306a-306i may behave very differently in wireless network 300 from both RF and traffic perspectives.

As noted above, large meeting rooms and other locations are typically equipped with multiple APs dispersed throughout the location. However, the roaming behaviors of clients also tend to concentrate client loads with some of the APs over others. For example, consider location 400 depicted in FIG. 4. As shown, assume that APs 404a-404d are situated at various points in location 400.

Figure 4:
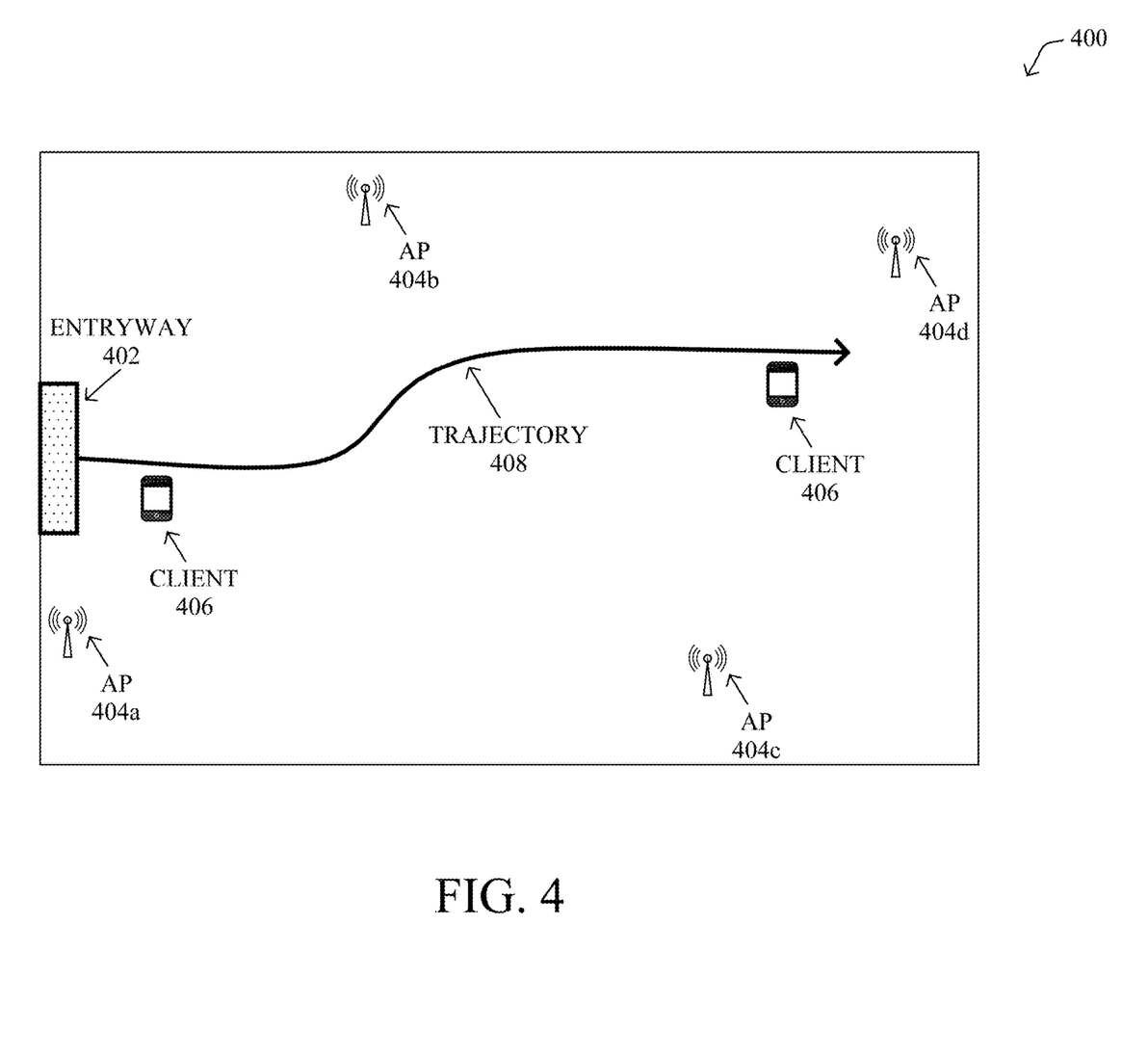
FIG. 4 illustrates an example of client movement in a location.

If location 400 includes an entryway 402, as is typical in the case of conference rooms, classrooms, auditoriums, and the like, the trajectories of clients will concentrate around entryway 402 and disperse, accordingly. For example, consider trajectory 408 of client 406. First, the operator of client 406 may enter location 400 via entryway 402. Then, he or she may move along trajectory 408 to his or her seat.

From a wireless networking perspective, client 406 may first associate with AP 404a, as AP 404a is located closest to entryway 402 and is likely to offer the best received signal strength indicator (RSSI) measurements. Even though client 406 may move away from AP 404a along trajectory 408, traditional roaming approaches dictate that client 406 will not roam to another AP, unless the RSSI from AP 404a drops below a certain threshold (e.g., 75 dBm). Note that such a decision is highly dependent on the roaming algorithm used by client 406. Regardless, it is often the case that client 406 will end up closer to another AP, such as AP 404d, than AP 404a to which it is attached. This movement behavior, more often than not, results in the APs closest to the entryway carrying a much higher client load than those that are farther way, even if the clients ultimately end up evenly disbursed throughout the location.

While there are some mechanisms available to effectively force a client to roam to another AP, doing so can also be disruptive to some transmissions. For example, the 802.11 standard includes a means to signal a client to roam to another AP. However, not every client supports this functionality. Another possibility would be to decrease the transmit power of the AP with the high client count. Again, this approach could cause some clients to suddenly lose connectivity to the wireless network altogether, which is not a desirable outcome. Thus, the challenge is to identify both 1.) whether clients should be swapped to other APs and, if so, 2.) when the AP rebalancing should occur.

Determining whether clients should be moved to other APs in a location may be possible by making inferences about the network traffic from the location. For example, certain types of application traffic may be more resilient to AP roaming than others. In addition, the RSSIs of the clients can also be taken into account, as many clients of the overloaded AP may have relatively low signal strength measurements.

Determining when to perform the AP rebalancing for a location is more complex. Indeed, it makes little sense to rebalance the AP client loads if there is a still high degree of client movement in the location. For example, in the example of FIG. 4, there may still be a steady stream of clients entering through entryway 402 that immediately attach to AP 404a. Ideally, the AP rebalancing should occur only after the client movement in the location has stabilized.

Detecting Stable Wireless Conditions to Rebalance AP Loads in Large Rooms

The techniques herein allow for the level of stability of client movement in a location to be quantified and used to initiate rebalancing of AP client loads. In some aspects, machine learning can be leveraged to assess and/or predict the stability of client movements in the location, so as to only trigger the rebalancing when the client movements are relatively stable.

Specifically, according to one or more embodiments of the disclosure as described in detail below, a supervisory service for a wireless network receives telemetry data indicative of client movement of wireless clients of the network within a location. The service determines a measure of client movement stability for the location, based on the received telemetry data. The service selects one or more of the clients for wireless access point reassignment, when the determined measure of client movement stability exceeds a predefined threshold. The service causes the selected one or more clients to switch from a first wireless access point at the location to a second wireless access point at the location.

Illustratively, the techniques described herein may be performed by hardware, software, and/or firmware, such as in accordance with the wireless communication optimization process 248, which may include computer executable instructions executed by the processor 220 (or independent processor of interfaces 210) to perform functions relating to the techniques described herein.

Figure 5:
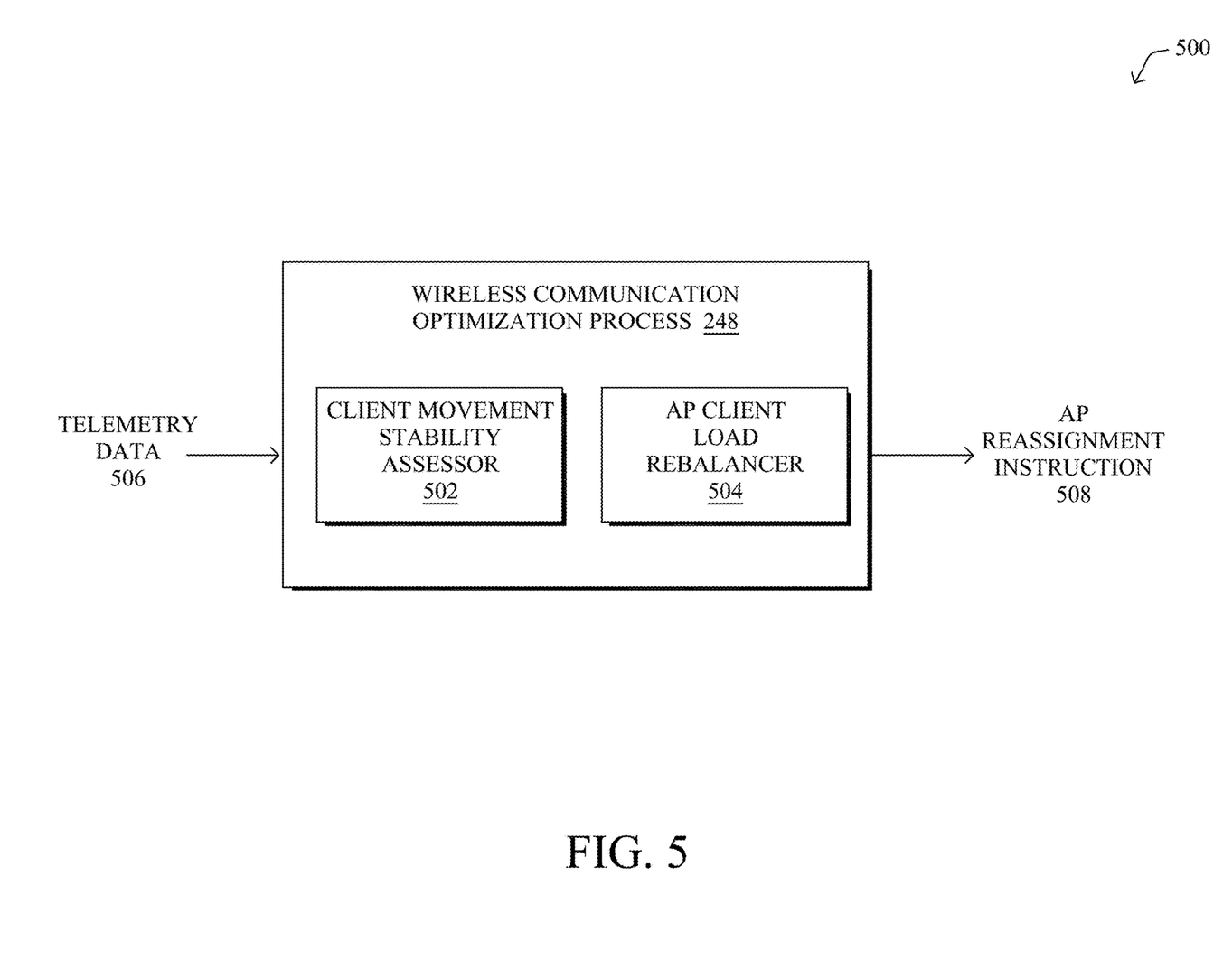
FIG. 5 illustrates an example architecture for detecting stable wireless conditions to rebalance access point loads.

Operationally, FIG. 5 illustrates an example architecture 500 for detecting stable wireless conditions to rebalance access point loads, according to various embodiments. At the core of architecture 500 is wireless communication optimization process 248 that may be executed by a device associated with a wireless network (e.g., device 200 described previously), to provide a supervisory service to the wireless network. For example, wireless communication optimization process 248 may be executed by monitoring and analytics service 314, WLC 312, or even directly on any of the APs 304 described previously with respect to FIG. 3. As shown in FIG. 5, wireless communication optimization process 248 may include the following components: a client movement stability assessor 502 and/or an AP client load rebalancer 504. These components 502-504 may be implemented in a distributed manner or implemented as their own stand-alone services, either as part of the network under observation or as a remote service. In addition, the functionalities of the components of architecture 500 may be combined, omitted, or implemented as part of other processes, as desired.

In various embodiments, client movement stability assessor 502 may be configured to quantify the overall stability of client movement in a location by calculating a measure of client movement stability. To do so, client movement stability assessor 502 may take as input telemetry data 506 received from the wireless network.

In general, telemetry data 506 may include measurements from the APs or other networking gear deployed to the location under scrutiny by client movement stability assessor 502. For example, telemetry data 506 may include information indicative of any or all of the following:

Client locations—In various embodiments, telemetry data 506 may include measurements that can be used by client movement stability assessor 502 to estimate the locations of clients in the area or, alternatively, may include location estimates that have been predetermined by another device for consumption by client movement stability assessor 502. For example, telemetry data 506 may include measurements such as the angle of arrival (AoA) of communications from the clients, the RSSIs, etc., that can be used by process 248 to estimate the locations of the client AP client load information—Telemetry data 506 may also include information regarding the number of clients attached to each of the APs in the location.

Traffic characteristic data—In some cases, telemetry data 506 may further include information regarding the types of traffic associated with the various clients in the location. This information can be used by process 248, for example, when determining which clients to move to another AP, so as not to interrupt application traffic that is more sensitive to wireless client roaming.

Timestamps—Associated with the various measurements included in telemetry data 506 may also be timestamp information indicative of when the measurements were taken by the network.

Using telemetry data 506, client movement stability assessor 502 may assess the client movement stability, to determine whether the situation is stable or chaotic. As pointed out earlier, chaotic situations occur when a large number of clients in the location are moving (e.g., when students are filing into a classroom, etc.). Under such conditions, it is typically more harmful than beneficial to initiate client load rebalancing of the APs at the location, as the clients are still moving.

By observing the first/second derivative of the number of clients moving in the location, along with their trajectories, velocities, etc. it becomes possible for client movement stability assessor 502 to determine a measure of client movement stability for the location. For example, when the derivatives of the client locations over time, velocities over time, etc., fall below a certain threshold, this may indicate that the clients have mostly stopped moving, resulting in a higher measure of client movement stability.

In various embodiments, client movement stability assessor 502 may use machine learning, to determine the measure of client movement stability for the location. In one embodiment, client movement stability assessor 502 may include a machine learning-based anomaly detector that models the client movements in the location. Notably, clients tend to remain relatively stationary, except in well-bounded nomadic spaces, such as hallways. In the case of a conference room or other location, this stationary client behavior can be modeled using machine learning. In turn, chaotic situations (e.g., students are entering or leaving a classroom en masse, meeting attendees are entering or leaving a conference room, etc.) may trigger the trained anomaly detector to flag these anomalous/chaotic situations, to prevent wireless communication optimization process 248 from initiating rebalancing of the AP client loads in the location during these times.

With above approach, client movement stability assessor 502 may continually monitor the measure of client mobility stability, to detect stable situations during which AP client loads can be safely rebalanced. In further embodiments, a potentially complimentary approach is for client movement stability assessor 502 to use machine learning to predict when the location is likely to experience periods of client movement stability or chaos. To that end, client movement stability assessor 502 may include a regression model, or other suitable machine learning-based model, that is trained to predict the measure of client mobility stability.

In general, the predictive model of client movement stability assessor 502 may take into account factors regarding the topology of the location (e.g., AP placements, dimensions, etc.), historical data related to client movements observed in the location, the number of clients in the location, the client types encountered (e.g., to model the roaming decision algorithms used by the clients), timing information, and/or any other information that can be used to predict whether the location is likely to experience a period of stability with respect to its client movements as a function of time of day, week, etc. For example, on a typical Monday, a classroom may experience a high degree of client movement between 10:55-11:00 AM, just prior to a class starting, followed by a period of high client movement stability between 11:01-12:00, as the students remain relatively stationary. By learning a regression model from a time series of telemetry data 506, the regression model should be able to predict such changes in the client movement stability for the location.

In other words, client movement stability assessor 502 may calculate a measure of client movement stability that quantifies how stationary the clients are (or are predicted to be) within the location under scrutiny. When the measure of client movement stability exceeds a predefined threshold, and either for an observed or predicted period of time, client movement stability assessor 502 may signal to AP client load rebalancer 504 that it is safe to begin rebalancing the AP client loads in the location. While the measure of client movement stability is described herein as a positive value that increases with the number of stationary clients in the location, this description is illustrative only and can be represented in any number of ways. For example, the measure of client movement stability can alternatively be represented as a measure of client movement instability. Thus, as used herein, the measure exceeding a predefined threshold generally refers to any situation in which the clients in the location are suitably stationary to initiate AP client load rebalancing.

In various embodiments, when client movement stability assessor 502 determines that the client movement situation is suitably stable, AP client load rebalancer 504 may select one or more clients at the location to move to a different AP. Selection of the one or more clients may be based on, for example, the locations of the one or more clients relative to other available APs, the traffic characteristics/profiles of the client(s), or any other information that AP client load rebalancer 504 can use to select clients for AP reassignment that would have minimal impact on the client(s). For example, referring briefly again to FIG. 4, AP client load rebalancer 504 may determine that client 406 is a good candidate to be switch from AP 404a to AP 404d, as AP 404d is actually closer to client 406 and the traffic of client 406 is such that the switchover will have minimal impact.

In some embodiments, AP client load rebalancer 504 may also leverage machine learning, to select the individual client(s) to be switched to another AP. For example, AP client load rebalancer 504 (or client movement stability assessor 502) may calculate measures of client movement stability for each of the clients at the location and base the reassignment selection in part on these measures. Indeed, even if the overall client movement in the location is relatively stable, it may be that a given client is still very mobile and should be avoided from being selected.

Once AP client load rebalancer 504 has identified a client to be switched from its current AP to that of another, AP client load rebalancer 504 may issue an AP reassignment instruction 508 to that client and/or to the AP(s) involved. In one embodiment, AP reassignment instruction 508 may cause the current AP of the client to issue an 802.11v roaming instruction to the client, to cause the client to roam to the other AP. In another embodiment, AP reassignment instruction 508 may cause the current AP to lower its transmit power. By doing so, the RSSIs of some clients of that AP may drop below a certain threshold, causing those clients to roam to APs that provide better metrics. In such cases, wireless communication optimization process 248 may maintain a power level oscillation period for the AP, to allow the transmit power of the AP to fluctuate between a minimum and maximum value. For example, an AP located close to an entryway for the location may use a minimal transmit power during times of high client movement (e.g., right before the start of a meeting, class, etc.) and a higher transmit power during times of higher client movement stability. In yet another embodiment, AP reassignment instruction 508 could even cause the AP to drop certain clients, to cause them to reattach to a different AP. While typically disruptive, this may be viable, depending on the traffic profile(s) of the selected client(s). For example, if a selected client has a very low traffic volume, AP client load rebalancer 504 may determine that it is safe to disconnect the client from its current AP, to cause the client to join a different AP.

Figure 6:
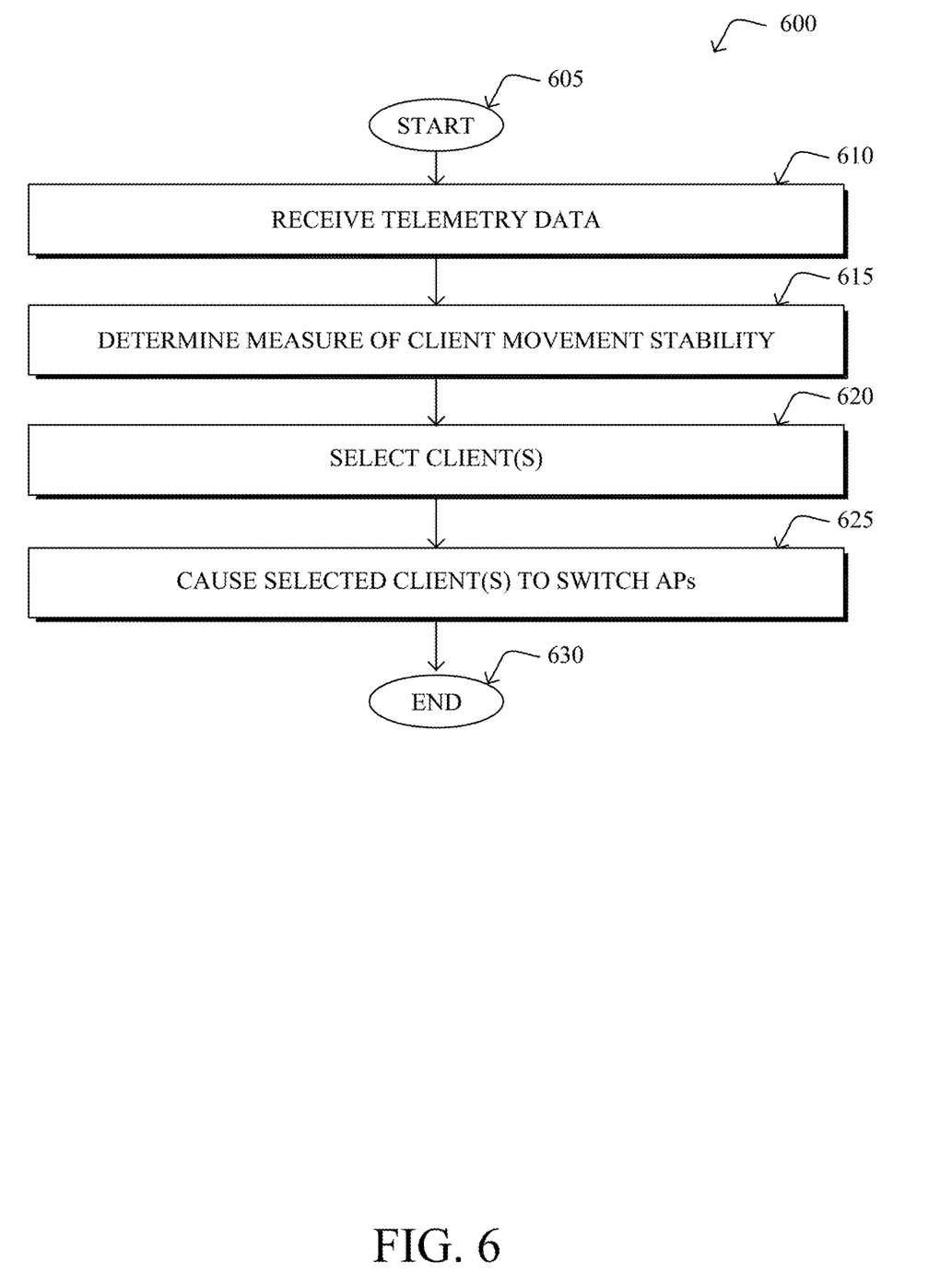
FIG. 6 illustrates an example simplified procedure for rebalancing access point loads in a location.

FIG. 6 illustrates an example simplified procedure for rebalancing access point loads in a location, in accordance with the embodiments herein. For example, a non-generic, specifically configured device (e.g., device 200) may perform procedure 600 by executing stored instructions (e.g., process 248), to provide a supervisory service to a wireless network. The procedure 600 may start at step 605, and continues to step 610, where, as described in greater detail above, the service may receive telemetry data indicative of client movement of wireless clients of the network within a location. Such telemetry data may indicate, for example, the estimated locations of the clients, whether the clients are moving, timing information (e.g., for how long the clients have remained in motion or stationary), and/or any other information regarding the state of the clients in the location.

At step 615, as detailed above, the service may determine a measure of client movement stability for the location, based on the received telemetry data. In some embodiments, the service may take a predictive approach by training and using a regression-based or other machine learning-based model to predict whether the measure of client movement stability for the location will remain above the predefined threshold for a specified amount of time. Such a regression model may be based, for example, on an input time series of client locations. In further embodiments, the service may take an anomaly detection approach by using the telemetry data as input to a machine learning-based anomaly detector trained to determine when the client movements are anomalous/chaotic.

At step 620, the service may select one or more of the clients for wireless access point reassignment, when the determined measure of client movement stability exceeds a predefined threshold, as described in greater detail above. In various embodiments, the selection may be based on their traffic profiles (e.g., to favor reassigning clients with traffic that will be relatively unaffected by the move), their locations (e.g., to select the clients that are farthest away from the AP and closest to other APs), their roaming algorithms (e.g., to favor moving clients that can be directly instructed to roam), combinations thereof, or the like.

At step 625, as detailed above, the service may cause the selected one or more clients to switch from a first wireless access point at the location to a second wireless access point at the location. In some cases, the service may send an instruction to the client(s) to roam to the second wireless access point. In another embodiment, the service may instruct the first wireless access point to lower its transmit power. Doing so may cause the selected client(s) to naturally roam to other APs. In a further embodiment, the service may disconnect the selected one or more clients from the first wireless access point. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for better client load balancing across wireless access points in a location. In some aspects, the techniques first quantify the level of client movement stability, to ensure that most, if not all, of the clients at the location are relatively stationary, before initiating the load rebalancing. In further aspects, the techniques herein may also select clients to be switched to a different access point, so as to minimize the impact of the rebalancing on the clients.

While there have been shown and described illustrative embodiments that provide for detecting stable wireless conditions to rebalance AP loads, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
  receiving, at a supervisory service for a wireless network, telemetry data indicative of client movement of wireless clients of the network within a location;
  determining, by the supervisory service, a measure of client movement stability for the location, by using a time series of the received telemetry data as input to a regression model;
  selecting, by the supervisory service, one or more of the clients for wireless access point reassignment, when the determined measure of client movement stability, using the regression model, is predicted to be above or below a predefined threshold for a specified amount of time; and
  causing, by the supervisory service, the selected one or more clients to switch from a first wireless access point at the location to a second wireless access point at the location.

2. The method as in claim 1, wherein the supervisory service selects the one or more clients for wireless access point reassignment, when the regression model predicts that the measure of client movement stability for the location will remain above the predefined threshold for the specified amount of time.

3. The method as in claim 1, further comprising:
  calculating measures of client movement stability for each of the one or more clients, wherein the one or more clients are selected for wireless access point reassignment based on their measures of client movement stability and their locations relative to the second wireless access point.

4. The method as in claim 1, wherein determining the measure of client movement stability comprises:
  using the telemetry data as input to a machine learning-based anomaly detection model.

5. The method as in claim 1, wherein causing the selected one or more clients to switch from the first wireless access point at the location to the second wireless access point at the location comprises:
  disconnecting the selected one or more clients from the first wireless access point.

6. The method as in claim 1, wherein causing the selected one or more clients to switch from the first wireless access point at the location to the second wireless access point at the location comprises:
  instructing the first wireless access point to lower its transmit power.

7. The method as in claim 1, wherein the first wireless access point is located closer to an entryway of the location than the second wireless access point is to the entryway.

8. The method as in claim 1, wherein the one or more clients are selected for wireless access point reassignment based on traffic profiles of the one or more clients.

9. An apparatus, comprising:
  one or more network interfaces to communicate with a wireless network;
  a processor coupled to the network interfaces and configured to execute one or more processes; and
  a memory configured to store a process executable by the processor, the process when executed configured to:
    receive telemetry data indicative of client movement of wireless clients of the network within a location;
    determine a measure of client movement stability for the location, by using the received telemetry data by using a time series of the received telemetry data as input to a regression model;
    select one or more of the clients for wireless access point reassignment, when the determined measure of client movement stability, using the regression model, is predicted to be above or below a predefined threshold for a specified amount of time; and
    cause the selected one or more clients to switch from a first wireless access point at the location to a second wireless access point at the location.

10. The apparatus as in claim 9, wherein the apparatus selects the one or more clients for wireless access point reassignment, when the regression model predicts that the measure of client movement stability for the location will remain above the predefined threshold for the specified amount of time.

11. The apparatus as in claim 9, wherein the process when executed is further configured to:
  calculate measures of client movement stability for each of the one or more clients, wherein the one or more clients are selected for wireless access point reassignment based on their measures of client movement stability and their locations relative to the second wireless access point.

12. The apparatus as in claim 9, wherein the apparatus determines the measure of client movement stability by:
using the telemetry data as input to a machine learning-based anomaly detection model.

13. The apparatus as in claim 9, wherein the apparatus causes the selected one or more clients to switch from the first wireless access point at the location to the second wireless access point at the location by:
disconnecting the selected one or more clients from the first wireless access point.

14. The apparatus as in claim 9, wherein the apparatus causes the selected one or more clients to switch from the first wireless access point at the location to the second wireless access point at the location by:
instructing the first wireless access point to lower its transmit power.

15. The apparatus as in claim 9, wherein the first wireless access point is located closer to an entryway of the location than the second wireless access point is to the entryway.

16. The apparatus as in claim 9, wherein the one or more clients are selected for wireless access point reassignment based on traffic profiles of the one or more clients.

17. A tangible, non-transitory, computer-readable medium storing program instructions that cause a supervisory service for a wireless network to execute a process comprising:
receiving, at the supervisory service for the wireless network, telemetry data indicative of client movement of wireless clients of the network within a location;
determining, by the supervisory service, a measure of client movement stability for the location, by using a time series of the received telemetry data as input to a regression model;
selecting, by the supervisory service, one or more of the clients for wireless access point reassignment, when the determined measure of client movement stability, using the regression model, is predicted to be above or below a predefined threshold for a specified amount of time; and
causing, by the supervisory service, the selected one or more clients to switch from a first wireless access point at the location to a second wireless access point at the location.

18. The computer-readable medium as in claim 17, wherein determining the measure of client movement stability comprises:
using the telemetry data as input to a machine learning-based anomaly detection model.

\* \* \* \* \*